United States Patent
Schmidl et al.

(10) Patent No.: US 7,289,570 B2
(45) Date of Patent: Oct. 30, 2007

(54) WIRELESS COMMUNICATIONS

(75) Inventors: Timothy Schmidl, Dallas, TX (US); Mohammed Nafie, Richardson, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1131 days.

(21) Appl. No.: 09/832,410

(22) Filed: Apr. 10, 2001

(65) Prior Publication Data

US 2002/0034263 A1   Mar. 21, 2002

Related U.S. Application Data

(60) Provisional application No. 60/195,927, filed on Apr. 10, 2000.

(51) Int. Cl.
  *H04B 7/02* (2006.01)
  *H04L 1/02* (2006.01)
(52) U.S. Cl. ............ 375/267; 375/299; 375/347; 455/101; 455/562.1; 455/575.1

(58) Field of Classification Search ........... 375/299, 375/267, 150, 295, 347; 455/63.1, 506, 101, 455/562.1, 575.7; 342/378, 417, 445
See application file for complete search history.

(56) References Cited

U.S. PATENT DOCUMENTS

| | | | | |
|---|---|---|---|---|
| 5,471,647 A | * | 11/1995 | Gerlach et al. | 455/63.1 |
| 5,999,800 A | * | 12/1999 | Choi et al. | 455/73 |
| 6,067,324 A | * | 5/2000 | Harrison | 375/267 |
| 6,091,361 A | * | 7/2000 | Davis et al. | 342/378 |
| 6,353,643 B1 | * | 3/2002 | Park | 375/347 |
| 6,765,969 B1 | * | 7/2004 | Vook et al. | 375/259 |

OTHER PUBLICATIONS

An efficient adaptive algorithm for the direction-of-arrival (DOA) estimation utilizing the solution of extreme eigenvalue problem, Choi et al.; Antennas and Propagation Society International Symposium, 1991. AP-S. Digest, Jun. 24-28, 1991, pp. 376-379.*

* cited by examiner

*Primary Examiner*—Dac Ha
*Assistant Examiner*—Ted M. Wang
(74) *Attorney, Agent, or Firm*—Wade J. Brady, III; Frederick J. Telecky, Jr.

(57) ABSTRACT

A wireless system (e.g., Bluetooth, WCDMA, etc.) with multiple antenna communication channel eigenvector weighted transmissions including possibly differing order symbol constellations for differing eigenvectors. Comparison of maximizations of minimum received symbol distances provides for selection of eigenvector combinations and symbol constellations.

11 Claims, 2 Drawing Sheets

WIRELESS COMMUNICATIONS

CROSS-REFERENCE TO RELATED APPLICATIONS

This application claims priority from provisional application Ser. No. 60/195,927, filed Apr. 10, 2000. The following patent applications disclose related subject matter: Ser. Nos. 09/634,473 and 09/634,819, both filed Aug. 8, 2000. These referenced applications have a common assignee with the present application.

BACKGROUND OF THE INVENTION

The invention relates to electronic devices, and more particularly to wireless communication.

Demand for wireless information services via cell phones and personal digital assistants (PDAs) is rapidly growing, and techniques and protocols for Internet access have problems such as the delay between requests for web pages which primarily derives from low transmission data rates. Wireless Application Protocol (WAP) attempts to overcome this web page delay problem by transmitting a group of web pages as a deck of cards with each card corresponding to a page of structured content and navigation specifications. Each WAP card has combined the data to be displayed with formatting instructions used in controlling the display of the data and thus causing larger than necessary data downloads for a fixed display format.

An alternative employs broadband wireline Internet access to a local access point and then uses Bluetooth™ wireless connection for the last link to an Internet appliance. The current Bluetooth gross (including overhead) speed of a 1 Mbps channel rate suffices for a 56 kbps wireline (phone line) connection at home. However, with broadband wireline connection to a Bluetooth access point in a home wireless LAN: creates a demand for high data rate Bluetooth.

Bluetooth is a system that operates in the ISM unlicensed band at 2.4 GHz. Slow frequency hopping (1600 hops per second) is used to combat interference and multipath fading: typically 79 channels are available (only 23 channels in France and Spain). The gross bit rate is 1 Mbps (maximal symmetrical data rate of 434 kbps and maximal asymmetrical data rate of 723 kbps), and each hop channel has a bandwidth of 1 MHz. Gaussian frequency shift keying (GFSK) modulation is used. Data packets include 1-2 byte payload headers for information about logical channel and payload length. Forward error correction with ⅔ rate may protect a payload of up to 339 bytes per packet. The link header for a packet has 54 bits and contains control information and active addresses. Each packet typically is transmitted on a different hop frequency (channel). Two communicating Bluetooth devices are termed the master device and the slave device with the downlink being the transmissions from master to slave and the uplink being the transmissions from slave to master.

Another alternative for higher data rate wireless communication is wideband code division multiple access (WCDMA). WCDMA is a proposed standard useful for cellular telecommunications systems with data rates on the order of 144 kbps for high mobility applications, 384 kbps for more pedestrian-class mobility, and 2 Mbps for fixed environments. Quadrature phase shift keying (QPSK) type symbols multiplied by the appropriate spreading-scrambling codes modulating root-raised-cosine pulses are transmitted at a chip rate of 3.84 Mcps.

SUMMARY OF THE INVENTION

The present invention provides a wireless system with multiple antennas on either device and channel information for eigenvector transmissions.

This has advantages including increased data rates in wireless systems such as Bluetooth and WCDMA.

DETAILED DESCRIPTION OF THE PREFERRED EMBODIMENTS

1. Overview

Figure 5:
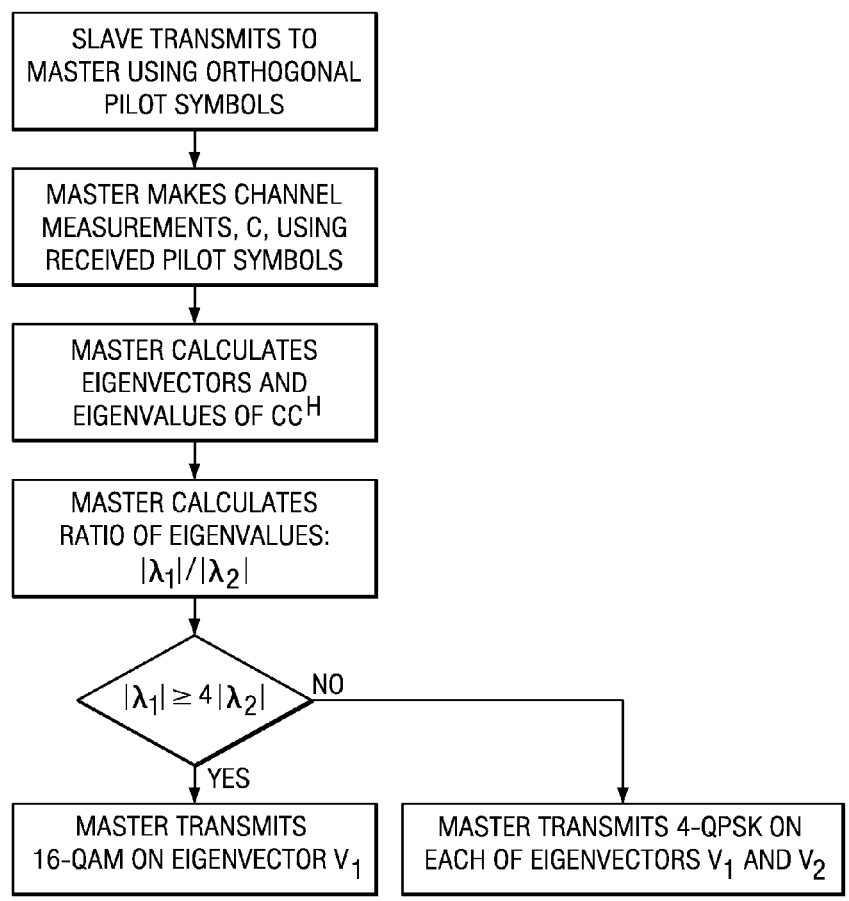

Preferred embodiment wireless systems (e.g., Bluetooth, WCDMA, and so forth) provide a feedback of estimated (measured) channel fading coefficients to adjust the transmission parameters and thereby increase the data rate for systems including transmitters having multiple antennas. When a transmitter has knowledge of the channel coefficients, it can transmit using antenna weightings to excite eigenvectors of the matrix product $CC^H$ of the channel fading coefficient matrix C with its Hermitian conjugate $C^H$. In particular, for a selected eigenvector the relative weightings of the baseband signals on the antennas of a transmitter's antenna array correspond to relative components of the eigenvector. Such eigenvectors are orthogonal and allow a receiver to be implemented with a matched filter for each eigenvector. In addition, more bits can be transmitted on the dominant eigenvector and fewer bits on the other eigenvectors, which will increase the data rate. FIG. 5 illustrates a preferred embodiment method in which a slave sends orthogonal pilot symbols to a master which can analyze the received signals to estimate (measure) the channel coefficients (i.e., find the matrix C) and thus estimate the eigenvectors and eigenvalues to use for a decision on symbol constellations for transmission on eigenvectors.

2. Two Antennas Preferred Embodiments

Figure 1:
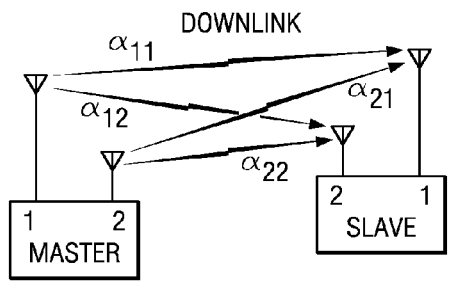
FIG. 1 shows a preferred embodiment system.
Figure 2:
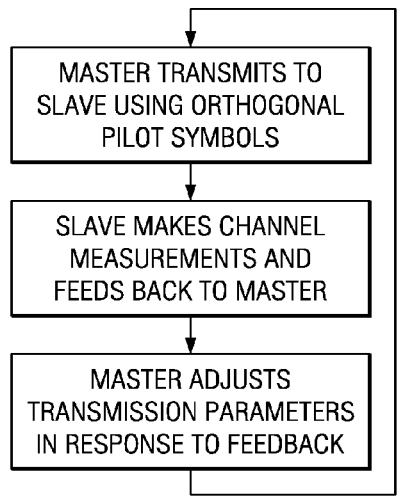

FIG. 1 schematically illustrates the downlink with both the master device and the slave device having two antennas. The channel coefficients (attenuation and phase shift) for the channel between the ith antenna of the master to the jth antenna of the slave is denoted $\alpha_{ij}$ and these coefficients are fed back from slave to master and master to slave. The feedback of channel coefficients can either be explicit as when channel measurements are fed back in a frequency division duplex (FDD) system or be implicit when channel measurements on one link are used to set the transmission parameters for the return link as could be done with a time division duplex (TDD) system. Because the downlink and uplink may be transmitted at different frequencies due to frequency hopping, the fading will be different on each link. In order for the master to obtain knowledge of the downlink channel, the slave must feed back channel measurement information; see FIG. 2. The master can send orthogonal pilots by transmitting pilot symbols from one antenna at a time, and the slave then can feed back the downlink channel fading coefficients for every combination of transmit and receive antennas. Alternatively, the slave can feed back the transmission vectors that should be used, and these transmission vectors do not need to be eigenvectors. This feedback can be performed by sending one or more bits during an uplink transmission.

Figure 3:
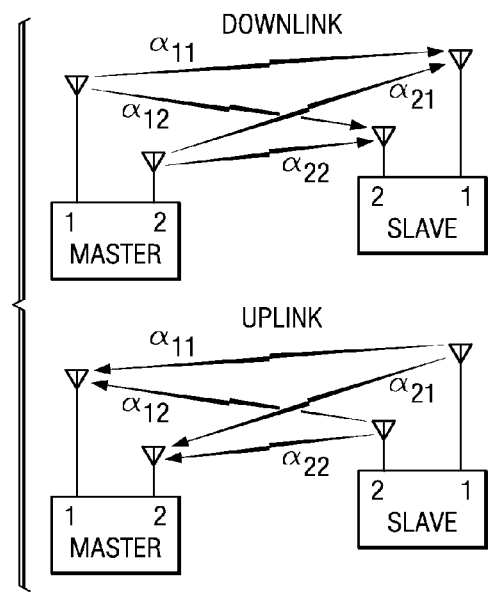
FIGS. 2-3 illustrate a preferred embodiment mobile device.
Figure 4:
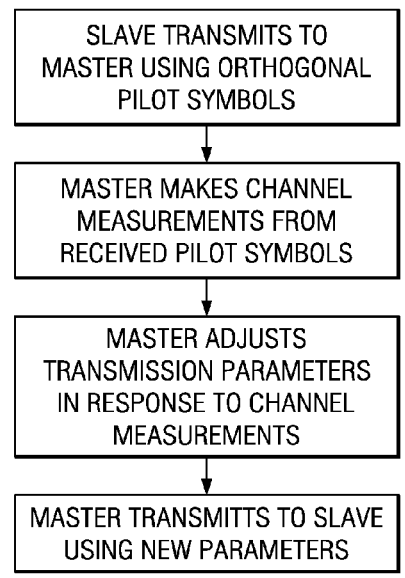
FIGS. 4-5 are flow diagrams of preferred embodiment methods.

In a TDD system in which the downlink and uplink occur at the same frequency, the channel fading coefficients will be the same for both links; see FIG. 3. Instead of using explicit feedback from the slave, the master can simply make channel measurements from the uplink transmission and use these measurements to adjust the downlink transmission; see FIG. 4. Bluetooth uses a frequency hopping TDD channel, so the uplink and downlink will generally use different frequencies. In order to allow implicit feedback for Bluetooth, use a modified hopping sequence approach such as having the downlink repeat the use of the prior uplink frequency.

Denote the baseband signals transmitted at the master's antennas 1 and 2 as $x^{(1)*}$ and $x^{(2)*}$, respectively, with * denoting complex conjugate and the superscript a vector (antenna) component. The baseband signals received at the slave's antennas 1 and 2, denoted $r^{(1)*}$ and $r^{(2)*}$, respectively, are thus $$r^{(1)*} = x^{(1)*}\alpha_{11} + x^{(2)*}\alpha_{21} \text{ and } r^{(2)*} = x^{(1)*}\alpha_{12} + x^{(2)*}\alpha_{22}$$

where $\alpha_{ij}$ is the fading coefficient (e.g., attenuation and phase shift) for the channel between antenna i of the transmitter and antenna j of the receiver. This can be expressed in matrix notation as $r^H = x^H C$ where $^H$ denotes Hermitian conjugate (complex conjugate transpose), $x^H$ and $r^H$ are 1×2 vectors, and C is the 2×2 matrix of channel coefficients:

$$C = \begin{bmatrix} \alpha_{11} & \alpha_{12} \\ \alpha_{21} & \alpha_{22} \end{bmatrix}$$

Figure 6:
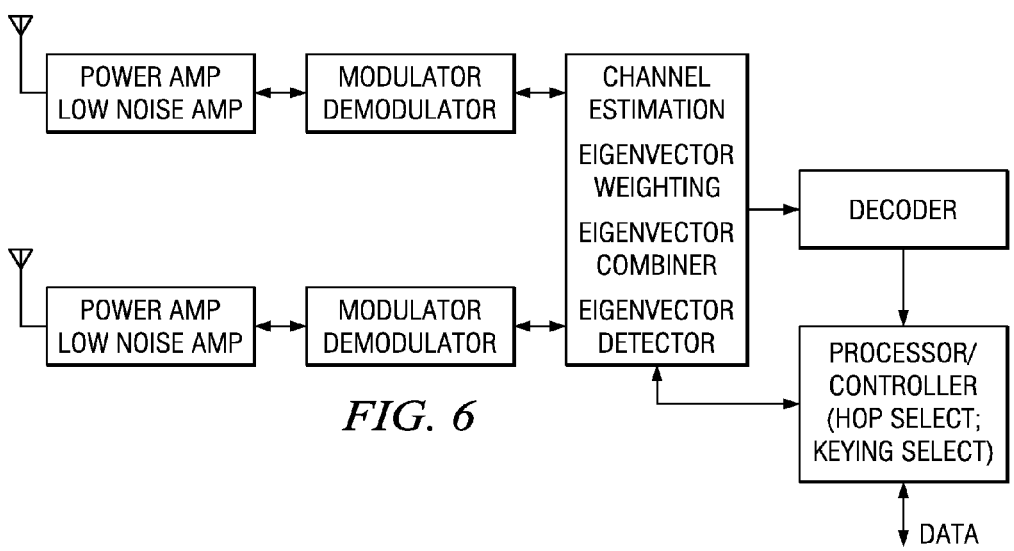
FIG. 6 shows a transceiver.

With either explicit or implicit feedback, the master will know the fading coefficients $\{\alpha_{ij}\}$ for the downlink channel; and hence the master can transmit signals which minimize the complexity of detection by the slave, or which minimize the probability of detection error by the slave, or which satisfy some other criteria. FIG. 6 illustrates a master or slave (transceiver) device for eigenvector transmission and detection.

In particular, let $v_1$ and $v_2$ be the eigenvectors and $\lambda_1$ and $\lambda_2$ be the corresponding eigenvalues of the matrix $CC^H$ and take $\lambda_1$ as the eigenvalue with the larger magnitude. Then when the master transmits a data stream (symbols) d(k) according to $v_1^H$ (i.e., transmit component $d(k)v_1^{(1)*}$ from antenna 1 and component $d(k)v_1^{(2)*}$ from antenna 2), the slave can detect with a matched filter simply by multiplying the received vector by $C^H v_1$. That is, the transmission at the master is $d(k)v_1^H$, the channel applies C to yield a received 1×2 vector (two slave antennas) $d(k)v_1^H C$, and the slave multiplies by (correlates with) the 2×1 vector $C^H v_1$ to yield $d(k) v_1^H CC^H v_1 = d(k)\lambda_1 v_1^H v_1 = d(k)\lambda_1$, because $v_1$ is the eigenvector (of unit magnitude) of $CC^H$ for eigenvalue $\lambda_1$. And another data stream c(k) transmitted according to $v_2^H$ will not interfere with detection of the d(k) data stream because $v_1$ and $v_2$ are orthogonal as eigenvectors of the Hermitian matrix $CC^H$. In particular, transmitted $c(k)V_2^H$ is received as $c(k)v_2^H C$, and then multiplication by $C^H v_1$ yields $c(k)v_2^H CC^H v_1 = c(k)\lambda_1 v_2^H v_1 = 0$. Further, the slave can also detect the transmission according to $v_2^H$ with a matched filter of multiplication by $C^H v_2$: the data stream transmitted as $d(k)v_1^H$ leads to $d(k)v_1^H CC^H v_2 = d(k)\lambda_2 v_1^H v_2 = 0$ again by orthogonality of the eigenvectors; and the data stream transmitted as $c(k)v_2^H$ leads to $c(k)v_2^H CC^H v_2 = d(k)\lambda_2 v_2^H v_2 = c(k)\lambda_2$. Because $|\lambda_1| \geq |\lambda_2|$, the transmissions according to $v_1^H$ will likely have a better signal to noise ratio than the transmissions according to $v_2^H$. Thus, maximize the downlink capacity by using a water pouring solution: more bits are transmitted on the eigenvector corresponding to the larger eigenvalue $\lambda_1$ and fewer bits to the eigenvector of the smaller eigenvalue $\lambda_2$. That is, the symbols transmitted, d(k) and c(k), could be from different size constellations: the constellation for the eigenvector of the larger eigenvalue can be larger than the constellation for the other eigenvector(s). And the constellation size can be dynamically adjusted according to the quality of the channel associated with the eigenvector. This can be done by transmitting quadrature amplitude modulation (QAM) symbols on each eigenvector with the constellation size determined by the quality of each eigenvector channel. The number of bits on each eigenvector can be indicated in a packet header.

The eigenvalues for $CC^H$ are fairly simple to express in terms of the channel coefficients. In particular, let a and b be the two row vectors of the matrix C; then $$CC^H = \begin{bmatrix} |a|^2 & \langle a|b \rangle \\ \langle b|a \rangle & |b|^2 \end{bmatrix}$$

and the two eigenvalues are $[|a|^2+|b|^2 \pm \sqrt{(4|\langle a|b\rangle|^2 + (|a|^2 - |b|^2)^2)}]/2$. Of course, the eigenvalues sum to the trace of the matrix; namely, $|a|^2+|b|^2$. And the case of a and b orthogonal ($\langle a|b\rangle=0$), yields two eigenvalues $|a|^2$ and $|b|^2$ with eigenvectors a/|a| and b/|b|, respectively.

3. Varying Antenna Array Size Preferred Embodiments

The foregoing eigenvector mode transmission extends to three or more antennas. Generally, for the case of M transmitter (master) antennas and N receiver (slave) antennas, the number of nonzero eigenvalues (and thus the number of eigenvectors on which to transmit and have receiver matched filters to separate) equals the minimum of M and N. Indeed, the downlink channel coefficient matrix C is M×N, so the master's M-component transmission is received as N-components; the slave receiver applies N×M matrix $C^H$ to yield an M-component vector and correlates with the M-component eigenvectors of M×M matrix $CC^H$ to project the transmitted vector onto the eigenvectors and recover the transmitted information. Analogously, the uplink (slave to master) channel coefficient matrix is the transpose of C, $C^T$, which is N×M and the slave's N-component uplink transmission is received as an M-component vector; the master applies the N×M Hermitian conjugate matrix $(C^T)^H$ to yield an N-component vector to correlate with the eigenvectors of the N×N matrix $C^T C^{TH} = (C^H C)^*$. Note that the nontrivial eigenvectors of $C^H C$ (and thus also $(C^H C)^*$) and of $CC^H$ are related as images of each other: if $CC^H v = \lambda v$, then $w = C^H v$ is an eigenvector of $C^H C$ by $C^H C w = C^H CC^H v = C^H \lambda v = \lambda w$.

4. Maximized Minimum Distance Constellation Preferred Embodiments

Alternative preferred embodiments apply eigenvector weighted transmissions (by the master) over multiple antennas with the weighting criteria including maximization of the minimum distance between constellation points (baseband symbols) at the receiver (slave). Maximizing the minimum constellation distance guarantees minimizing the raw error probability which is the important measure when no error correction coding is used or when error correction coding is used but hard decision decoding is employed. In both of these cases presume no space code is used. Also, different sized constellations will have different numbers of nearest neighbors, so adjust for this by using the theoretical error performance for each constellation.

The preferred embodiments in effect provide at least approximate solutions when the master (transmitter) has M antennas and the slave (receiver) has N antennas to the problem of finding the M-dimensional transmission antenna weighting vector $x_i^H$ for the ith point in the transmission constellation so the received N-dimensional vector $r_i^H = x_i^H C$ satisfies:

$$\max_{\substack{transmit \\ constellation}} \min_{i \neq j}(r_i - r_j)^H(r_i - r_j)$$

First consider transmitting K data streams (K symbols taken from constellations $Q_1 \ldots Q_K$) with each data stream's weightings on the M antennas expressed as a linear combination of eigenvectors of the $CC^H$ matrix; that is, $x_i^H$ as:

$$x_i^H = Q^i Y = [Q_1^i Q_2^i \ldots Q_K^i] \begin{bmatrix} \sum a_{m,1} v_m^H \\ \sum a_{m,2} v_m^H \\ \sum a_{m,3} v_m^H \\ \ldots \\ \ldots \\ \sum a_{m,K-1} v_m^H \\ \sum a_{m,K} v_m^H \end{bmatrix}$$

where $Q^i$ is a 1×K vector of the ith points (symbols) of K constellations ($Q_k^i$ is the ith point of the kth constellation), the sums are over $1 \leq m \leq M$, $v_m$ is the mth eigenvector of the M×M matrix $CC^H$ where the elements of the M×N matrix C are the channel coefficients $\{\alpha_{ij}\}$ for the channel from the ith transmit antenna to the jth receive antenna, and $a_{m,k}$ is the linear combination coefficient of the mth eigenvector when using the kth constellation. Note that Y, the column of sums, is a K×M matrix because each eigenvector $v_m^H$ in the sums is a 1×M vector.

Thus the maximization becomes $$\max_{\substack{transmit \\ constellations}} \min_{i \neq j}(Q^i - Q^j)^H Y CC^H Y^H (Q^i - Q^j)$$

This maximization yields a maximum likelihood receiver, but at high bit rates this might become extremely complex. Therefore a simple receiver will be very attractive. So first consider the case of $a_{m,k}=0$ except when m=k; this means transmissions using only the kth eigenvector for the kth constellation and this diagonalizes the K×M matrix Y. Such transmission of constellation points on the eigenvectors allows use of a low-complexity matched filter receiver to recover the data streams as previously described in the 2×2 case. Specifically, because $v_m^H CC^H v_n = 0$ except for m=n, there is no interference from one data stream on one eigenvector to another data stream on another eigenvector. Next, also presume M=N; that is, further consider the case of the number antennas in the transmitter equal to the number of antennas in the receiver. Then transmission of a total bit rate of R means $\log_2(\Pi|Q_m|)=R$ where the product is over the M eigenvectors with constellation $Q_m$ on the mth eigenvector and where $|Q_m|$ is the number of points in constellation $Q_m$. For each possible distribution of constellation sizes the maximization is $$\max_{a_{m,m}} \min_{i \neq j}(Q^i - Q^j)^H \begin{bmatrix} |a_{1,1}|^2 \lambda_1 & 0 & & & 0 \\ 0 & |a_{2,2}|^2 \lambda_2 & & & 0 \\ 0 & 0 & 0 & & \\ & & \ldots & & \\ & & & \ldots & \\ 0 & & & 0 & \\ 0 & 0 & & 0 & |a_{M,M}|^2 \lambda_M \end{bmatrix} (Q^i - Q^j)$$

where $\lambda_m$ is the eigenvalue for the mth eigenvector $v_m$ of $CC^H$. Choosing all the constellations to have the same minimum distance between points permits a solution to the maximization by the M−1 equations $|a_{1,1}|^2 \lambda_1 = |a_{2,2}|^2 \lambda_2 = \ldots = |a_{M,M}|^2 \lambda_M$ subject to the total energy constraint equation; namely, if E is the average total energy and $E_m$ is the average energy of the mth constellation:

$$\sum_m E_m |a_{m,m}|^2 = E$$

Solving the foregoing M equations yields all of the required linear combination coefficients $a_{m,k}$ for each distribution of constellations This allows calculation of the performance for every possible constellation. These performance calculations provide thresholds on the eigenvalues of the channel matrix at which transmission should be switched from one eigenvector to two eigenvectors and from one constellation to another. The following sections have examples.

5. Two Antenna Diagonal Max-Min Preferred Embodiment

As an example of the foregoing maximization of minimum distance with diagonal Y matrix method applied to the previously described two antenna case: presume the data rate R=4 bits/transmission, then maximization provides:

(1) Transmit using a 16-QAM (4 bits per symbol) constellation on the eigenvector $v_1$ corresponding to the larger magnitude eigenvalue $\lambda_1$ when $|\lambda_1| \geq 4|\lambda_2|$ where $\lambda_2$ is the smaller magnitude eigenvalue.

(2) Transmit using two 4-QPSK (2 bits each symbol) constellations on the two eigenvectors $v_1$ and $v_2$ if $|\lambda_1|<4|\lambda_2|$ with the linear combination coefficients $a_{m,k}$ as $$a_{1,1}=\sqrt{(\lambda_2/(\lambda_1+\lambda_2))} \text{ and } a_{2,2}=\sqrt{(\lambda_1/(\lambda_1+\lambda_2))}$$

FIG. 5 illustrates the transmitter's decision method.

6. Three Antenna Diagonal Max-Min Preferred Embodiment

As a further example of the foregoing maximization of minimum distance with diagonal Y matrix method, apply the method to the three antennas for both master and slave case with the eigenvalues of the channel coefficient matrix $CC^H$ as $\lambda_1$, $\lambda_2$, and $\lambda_3$ such that $|\lambda_1| \geq |\lambda_2| \geq |\lambda_3|$ and corresponding eigenvectors $v_1$, $v_2$, and $v_3$. Presume the data rate R=6 bits/transmission, then the maximization provides:

(1) If $|\lambda_1| \geq 16|\lambda_2|$, then transmit a 64-QAM (6 bits per symbol) constellation on the eigenvector $v_1$.

(2) If $|\lambda_1|<16|\lambda_2|$ but $|\lambda_1| \geq 4|\lambda_2|$, transmit 16-QAM (4 bits) constellation on $v_1$ and transmit 4-QPSK (2 bits) constellation on eigenvector $v_2$.

(3) If $|\lambda_1|<4|\lambda_2|$ transmit 4-QPSK (2 bits) constellation on each of the three eigenvectors $v_1$, $v_2$, and $v_3$.

7. Two Antennas with Max-Min without Diagonal Preferred Embodiment

As an example of the foregoing maximization of minimum distance but without the presumption of a diagonal Y matrix method and again applied to the previously described two antenna case yields the maximization problem:

$$\max_{a_{m,n}} \min_{i \neq j} (Q^i - Q^j)^H \begin{bmatrix} |a_{1,1}|^2\lambda_1 + |a_{2,1}|^2\lambda_2 & a_{1,1}a_{1,2}^*\lambda_1 + a_{2,1}a_{2,2}^*\lambda_2 \\ \ldots & \\ a_{1,2}a_{1,1}^*\lambda_1 + a_{2,2}a_{2,1}^*\lambda_2 & |a_{1,2}|^2\lambda_1 + |a_{2,2}|^2\lambda_2 \end{bmatrix} (Q^i - Q^j)$$

where $Q^i$ is a 2×1 vector of the two ith constellation points. Now assume that $Q_1$ and $Q_2$ are each 4-QPSK (2 bits) and the data rate R=4 bits/transmission; then each eigenvector has a linear combination of both a $Q_1$ and a $Q_2$ constellation point and the maximization problem can be solved. In particular, employing the notation $A=(\frac{1}{2}+1/\sqrt{2})\lambda_2$ and $B=(\frac{1}{2}-1/\sqrt{2})\lambda_1$, a solution is:

$a_{1,1}=\exp(j\theta_1) \sqrt{(A/2)/(A+B)}$ $a_{2,2}=\exp(j\theta_2) \sqrt{(A/2)/(A+B)}$ $a_{1,2}=\exp(j\theta_3) \sqrt{(\frac{1}{2}-|a_{1,1}|)}$ $a_{2,1}=\exp(j\theta_4) \sqrt{(\frac{1}{2}-|a_{2,2}|)}$ where $\theta_1-\theta_2=3\pi/4$ and $\theta_3-\theta_4=-\pi/4$.

In contrast, if a single 16-QAM constellation is used, then $a_{1,2}=a_{2,2}=0$ (because no second constellation)

$a_{1,1}=\exp(j\theta_1)$ $a_{2,1}=\exp(j\theta_2)/(2+\sqrt{3})$ where $\theta_1-\theta_2=\pi/12$.

These results provide comparison of the performance in the alternative transmissions: two 2-bit symbols or one 4-bit symbol. The transmission with two less dense constellations is preferred when:

$$\lambda_1/\lambda_2 < ([1+2+\sqrt{3}]/\sqrt{2}-\frac{1}{2}-1/\sqrt{2})/(1/\sqrt{2}-\frac{1}{2})$$

Thus a transmitter could (periodically, intermittently) estimate eigenvalues ratios and use a lookup table to decide on the best constellation distribution.

These results all satisfy the necessary Kuhn-Tucker conditions for minimum points.

The foregoing technique provides design methods for space-time codes if the channel is known by assuming a block diagonal channel matrix that is of size MT by NT where T is the length of the desired space-time code.

8. Systems

The circuitry to perform the multiple-antenna channel-eigenvector Bluetooth, WCDMA, or other wireless communication may use digital signal processors (DSPs) or general purpose programmable processors or application specific circuitry or systems on a chip such as both a DSP and RISC processor on the same chip with the RISC processor controlling. A stored program in an onboard or external ROM, flash EEPROM, or ferroelectric RAM for a DSP or programmable processor could perform the signal processing. Analog-to-digital converters and digital-to-analog converters provide coupling to the real world, and modulators and demodulators (plus antennas for air interfaces) provide coupling for transmission waveforms. The encoded data can be packetized and transmitted over networks such as the Internet.

9. Modifications

The preferred embodiments may be modified in various ways while retaining the features of multiple antenna channel eigenvector adaptation for dynamic symbol constellation selection.

For example, the number of bits (total bit rate R) and constellations used could be varied, the ratio of eigenvalues for bit allocation decisions could be varied from the ideal to account for other aspects such as computational complexity, updating channel coefficient measurements and estimates could be performed periodically or in response to coefficient drift or change or a combination with aging factors. The maximizing constellation distributions and linear combinations of eigenvectors for many sets of available constellations in terms of the estimated eigenvalues can be stored in lookup tables (in both transmitter and receiver) and provide for switching to alternative constellations and linear combinations of eigenvectors, and so forth.

What is claimed is:

1. A method of wireless communication, comprising:
  (a) estimating at least one eigenvector of a matrix of communication channel coefficients for a channel between a first plurality of antennas and a second plurality of antennas;
  (b) transmitting using said first plurality of antennas with the relative weightings of baseband signals on said first plurality of antennas corresponding to components of said at least one eigenvector;
  (c) wherein said communication channel has P coefficients, $\alpha_{ij}$ for i =1, . . . , M and j=1, . . . , N where M and N are positive integers and P equals the product of M multplied by N, and $\alpha_{ij}$ relates to transmission from the ith antenna of a transmitter to the jth antenna of a receiver, and said matrix is $CC^H$ where C is the M×N matrix with ith row and jth column entry $\alpha_{ij}$ and $^H$ is Hermitian conjugate.

2. The method of claim 1, wherein:

(d) said signals on said antennas are a superposition of first signals weighted according to a first eigenvector of $CC^H$ plus second signals weighted according to a second eigenvector of $CC^H$ wherein the superposition depends upon first and second eigenvalues of $CC^H$.

3. The method of claim 2, wherein:

(e) number of bits allocated between said first signals and said second signals depends upon the ratio of said first eigenvalue and said second eigenvalue.

4. A method of wireless communication, comprising:

(a) estimating eigenvectors of a matrix of communication channel coefficients between a transmitter with M antennas (M an integer greater than 1) and a receiver with N antennas (N an integer greater than 1); and (b) transmitting on said communication channel baseband signals x1, . . . , xK (K is a positive integer) with the relative weightings of each of said signals among said antennas corresponding to components of a linear combination of said eigenvectors of said matrix;

(c) wherein said linear combinations of said signals maximize the minimum distance between received different signals at a receiver.

5. The method of claim 4, wherein:

(d) said communication channel has P coefficients, $\alpha_{ij}$ for i=1, . . . , M and j=1, . . . , N where P equals the product of M multiplied by N, and relates to transmission from the ith antenna of a transmitter to the jth antenna of a receiver, and said matrix is $CC^H$ where C is the M×N matrix with ith row and jth column entry $\alpha_{ij}$ and $^H$ is Hermitian conjugate.

6. The method of claim 4, further comprising:

(d) repeating step (c) of claim 4 for a plurality of distributions of constellations of symbols where each of said signals includes a symbol of a constellation as a factor for a corresponding linear combination; and (e) using for said transmitting of step (b) of claim 4 the distribution of constellations and corresponding linear combinations from step (d) of this claim which has a largest maximum.

7. The method of claim 4, wherein:

(d) each of said linear combinations has a single nonzero coefficient with a one-to-one relation between said K signals and K of said eigenvectors.

8. A transmitter, comprising:

(a) antennas A1, . . . , AM where M is a positive integer greater than 1;

(b) a channel analyzer coupled to said antennas and operable to estimate eigenvalues and eigenvectors of an M×M matrix derived from coefficients of a communication channel from said antennas to a receiver;

(c) a signal generator coupled to said antennas and to said channel analyzer and operable to apply signals S1, . . . , SM to said antennas A1, . . . , AM, respectively; wherein said signals are proportional to the components of a linear combination of said estimated eigenvectors.

9. The transmitter of claim 8, wherein:

(d) said channel analyzer is operable to compare the magnitudes of a first eigenvalue and a second eigenvalue; and (e) said signal generator allocates bits to be transmitted between first signals S'1, . . . , S'M and second signals S"1, . . . , S"M according to an output of said channel analyzer, wherein said first signals S'1, . . . , S'M are transmitted according to the components of said first eigenvector and said second signals S"1, . . . , S"M are transmitted according to the components of said second eigenvector and the signals S1, . . . , SM include the sums S'1+S"1, . . . , S'M+S"M, respectively.

10. The transmitter of claim 8, wherein:

(d) when said communication channel connects said antennas A1, . . . , AM with antennas B1, . . . , BN of a receiver for N a positive integer, said M×M matrix is $CC^H$ where C is an M×N matrix with element m,n an estimate of a channel coefficient from antenna Am to antenna Bn, and where $C^H$ is the Hermitian conjugate of C.

11. The transmitter of claim 8, wherein:

(d) said signal generator includes information of constellation distributions and linear combinations of eigenvectors in terms of eigenvalues.

* * * * *